United States Patent [19]

Kryltsov

[11] 4,040,109
[45] Aug. 2, 1977

[54] TAPE TRANSPORT SYSTEM OF VIDEO TAPE RECORDER WITH LONGITUDINAL RECORDING

[76] Inventor: Igor Alexeevich Kryltsov, Semenovskaya naberezhnaya, 3/1, korpus 5, kv. 102, Moscow, U.S.S.R.

[21] Appl. No.: 605,676

[22] Filed: Aug. 18, 1975

[51] Int. Cl.² .................. G11B 5/52; G11B 21/04; G11B 21/18
[52] U.S. Cl. ........................................ 360/107; 360/84
[58] Field of Search .................. 360/84, 85, 107, 108

[56] References Cited
U.S. PATENT DOCUMENTS
3,863,269   1/1975   Akamine .................. 360/107

Primary Examiner—Robert S. Tupper
Attorney, Agent, or Firm—Lackenbach, Lilling & Siegel

[57] ABSTRACT

A tape transport system of a video tape recorder with longitudinal recording, which comprises a traveling magnetic tape passing around a rotatable drum mounted on a deck and having at least one slot parallel to its axis. The slot accommodates movably mounted magnetic heads mechanically coupled with a drive of a shaft of this drum which enables movement of these magnetic heads along the slot simultaneously with their rotation and obtaining longitudinal video records.

12 Claims, 11 Drawing Figures

TAPE TRANSPORT SYSTEM OF VIDEO TAPE RECORDER WITH LONGITUDINAL RECORDING

The present invention relates to apparatus for recording electric signals on magnetic tape and more particularly to tape transport systems of video tape recorders with longitudinal recording used in broad-band magnetic recording systems and also in television image recording devices.

Known in prior art are several forms of magnetic recording of electric signals. Depending on the position of record tracks on the magnetic tape, oblique, lateral and longitudinal forms of recording may be distinguished. A typical feature for all the types of video recording is simultaneous use of two kinds of motion — progressive movement of the tape and rotational movement of one or more magnetic heads. Thus, for example, in oblique recording a moving magnetic tape spirally wrapped around the cylindrical surface of a stationary drum is scanned by magnetic heads which rotate in a circular slot thereon.

In lateral video recording magnetic heads built into a cylindrical surface of a rotating drum (usually four heads mounted in a 90° relationship) scan in turn a magnetic tape which is transported along the rotation axis of the drum and wrapped around it (across the tape width) at about 90°. Despite continuous improvement, these two forms of recording possess major drawbacks which limit to a considerable degree their applicability ranges. Elimination of a number of these drawbacks in physical apparatus makes the entire equipment much more complex and costly. For example, oblique recording devices may work normally using a rather narrow tape ($\frac{1}{2}$ to 1 inch wide), because the use of a wider tape requires a more complex tape transport system on account of an abruptly increasing side (shearing) force acting on the tape as it moves along a helical portion of the traveling path. For this reason, video recorders with oblique recording are now mainly employed in domestic and reporter video equipment where the requirements for the amount of information and its quality are not too stringent.

A major drawback of lateral video recording lies in a high frequency of switching magnetic heads and a short length of a record track (determined by the tape width) insufficient for recording one complete frame (or field) of a video image. These disadvantages are inherent in the very principle of these two forms of recording and their complete elimination is practically unfeasible.

However, since no other engineering alternative is available, systems using oblique or lateral recording have presently become firmly established in the practice of magnetic video recording.

Though considerable improvements have been made in the design of these devices in recent years, the devices are far from being optimum, because they need a highly accurate system for automatic control of the tape speed with respect to the heads. If this is not the case, the reading head cannot be accurately placed and follow the middle of a desired record track which decreases the dynamic range of a video channel and aggravates a signal-noise ratio. Taking into account that the width of a magnetic record track is as small as 150-200 $\mu$m (and tends to further decrease), it becomes obvious that the magnetic head in reading video information cannot be absolutely accurately brought into phase with the desired track following relationship, and that even "satisfactory" phasing in these devices is attained through greatly increasing the complexity of the equipment and, consequently, results in a higher cost of the equipment. Another serious drawback of the above types of recording is unfeasibility of multi-channel video according on account of engineering difficulties involved in manufacturing a multi-channel head assembly with very small (less than 100 $\mu$m) spacings between adjacent magnetic paths.

Highly promising for eliminating the above limitations of lateral and oblique recording techniques is the use of longitudinal recording. However, devices for its implementation are so far so imperfect that it seems impracticable to use them for video recording purposes.

Known in the prior art is a tape transport system of a video tape recorder with longitudinal recording, which comprises a traveling magnetic tape wrapped around a capstan mounted on a deck and rotated, together with magnetic heads arranged in the capstan, through a drive connected to its shaft.

In this tape transport mechanism, all $n$ magnetic heads are arranged at equal spacings along the periphery of the capstan with a simultaneous shift along its axis. The traveling tape passes arounds the capstan, its arcuate path of travel being 360°/$n$. Each magnetic head records a separate track on the tape, with the number of tracks (across the width of the tape) equal to the number of magnetic heads mounted in the capstan and the length of the tracks determined by the arcuate path of tape travel around the capstan.

However, practical implementation of such a tape transport system for broad-band magnetic recording of moving images requires a rather large number (of about 100 and more) of magnetic heads to be mounted in a capstan so that difficulites involved in switching these heads render the entire device unreasonably complex and impracticable.

It is an object of the present invention to provide a tape transport system of a video tape recorder whereby video information is recorded and reproduced longitudinally on a tape which is simpler in construction than other known devices.

It is another object of the invention to improve the performance characteristics of a proposed system.

It is a further object of the invention to provide such a proposed system at a cost which is economical and competitive with other tape systems.

These and other objects of the invention are accomplished by a tape transport system of a video tape recorder with longitudinal recording, comprising a traveling magnetic tape wrapped around a drum which is mounted on a deck and rotated, together with magnetic heads arranged thereon, by a drive mechanically connected to a shaft of the drum, wherein, according to the invention, said drum has at least one slot parallel to its axis and magnetic heads are mounted on guides for free rotation in the slot and connected with the drive urging these heads to reciprocate along the slot.

It is preferable that a tape transport system where the tape is wrapped 180° around the drum has a drum with two diametrically opposed slots, each slot accommodating a pair of rigidly interconnected magnetic heads spaced at approximately half the working width of the tape, and that these heads are mechanically connected to the drive through a cam follower traveling along the rotation axis of the drum, with one end face thereof in contact with the magnetic heads, and also through a cam which interacts with the other end face of the cam follower and is driven directly from the drum shaft via a reducing gear mounted on the deck of the tape transport system, which urges the magnetic heads to move reciprocatingly through about half the working width of the tape.

It is advisable that in a tape transport system where the tape is wrapped approximately 360° around the drum, the drum has a pair of rigidly inter connected heads mounted in the slot of the drum and spaced at about half the working width of the tape, and that the heads are connected to the drive through the following members accommodated inside the drum: a helical cam in contact with the heads, a stationary shaft passing through the rotation axis of the drum, and a train of gears, of which one is fastened on the end face of the stationary shaft, another on the cam and the other two gears are rigidly interconnected, engage the above two gears and are mounted for free rotation in the drum, thus providing uniform reciprocating movement of the magnetic heads through approximately half the working width of the tape.

It is preferable that a tape transport system where the tape is wrapped 180° around the drum, has a drum with two slots 180° relative to each other along the drum periphery, each slot accommodating one magnetic head, and that these heads are connected to the drive through the following members accommodated inside the drum; two helical cams, each in contact with a respective magnetic head, a stationary shaft passing through the drum rotation axis, and two Geneva crosses with a common driver which engage alternately the pin of said driver mounted on the end face of a stationary shaft, each Geneva cross being coupled with a respective cam through a pair of gears one of which is rigidly connected with a Geneva cross and the other with a cam, thus imparting to the heads intermittent reciprocating motion through the entire working width of the magnetic tape.

Ir is also preferable that the slot of the drum accommodates additional (n-I) pairs of magnetic heads which are rigidly interconnected at a spacing equal to 1/2n of the working width of the magnetic tape and perform uniform reciprocating motion through a distance equal to about 1/2n of this width, thereby providing recording of video information in n channels simultaneously.

It is advantageous that each slot of a drum accommodates additional (n−I) magnetic heads which are rididly interconnected at a spacing equal to I/n of the working width of the tape and perform intermittent reciprocating motion through a distance equal to about I/n of this width, which provides recording of video information in n channels simultaneously.

A proposed tape transport system of a video tape recorder with longitudinal recording makes it possible to use a minimum number of magnetic heads for obtaining a required number of longitudinal video information paths on a magnetic tape and to increase the length of a longitudinal record path practically to the length (of half length) of the drum circumference. In its turn, this will assure recording of one complete frame (or a field) of a video image on each track of the tape record.

Besides, in longitudinal recording of video signals no stringent requirements are placed on maintaining the heads and tape in a proper speed and phase relationship, because even a pronounced instability of this relationship fails to impair the alignment of the record track with the travel of the magnetic head reading a video signal.

The latter circumstance allows to completely dispense with automatic systems for regulating the tape supply speed in such cases as, for example, in off-line system using punched magnetic tape, through rigid coupling of the tape transport members with the drum drive. The initial phasing of the tape-to-heads relationship can in these cases be effected manually when charging the apparatus by aligning special marks on the tape with the mark on the drum (while setting the head to its initial position) or automatically using automatic phasing devices of simple design.

This characteristic of longitudinal video recording enables also a much higher density of recording video information on a tape through a considerable reduction in the width of the tracks and gaps between (down to 30–50 μm), because a certain redundancy present in known devices is dictated by the inadequacy of a mechanism for bringing the path of head travel during recording in alignment with the path of its travel during playback of a video signal. Another important advantage of a proposed tape transport system is that it offers a simple possibility of simultaneous video recording in several channels which is a problem till now unsolved in known systems.

The invention can be more fully understood from the following detailed description of preferred embodiments thereof when read with reference to the accompanying drawings wherein.

Figure 1:
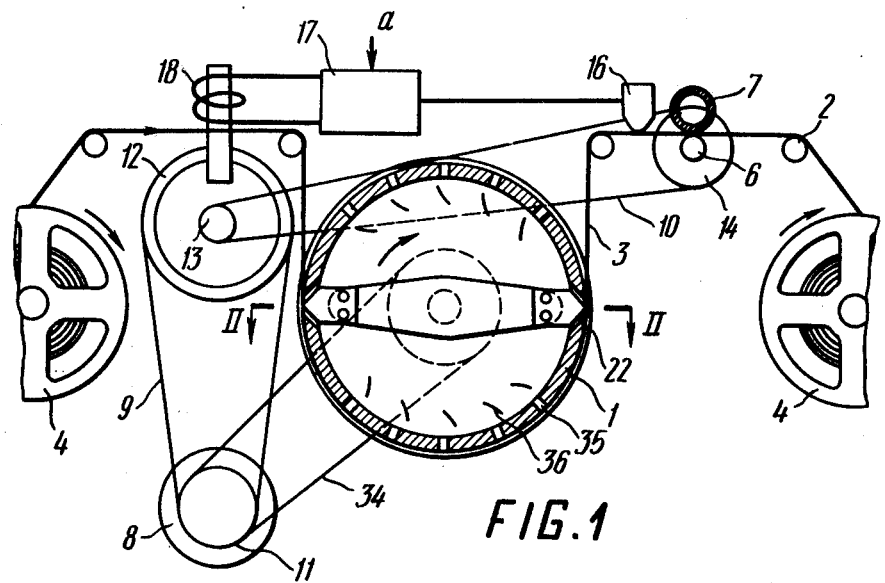
FIG. 1 is a schematic diagram of a proposed tape transport system of a video tape recorder with longitudinal recording with the drum shown in cross section.

A proposed tape transport system of a video tape recorder with longitudinal recording comprises a drum I (FIG. 1) around which guides 2 pass a magnetic tape 3 wound on rolls 4 disposed on a face of the drum 1 and mounted together with the drum 1 on a deck 5 (FIG. 2) of the tape transport system.

The tape 3 (FIG. 1) is transported by a drive shaft 6 in engagement with a pressure roller 7 and connected with a drive 8 through endless flexible belts 9 and 10 and pulleys 11, 12, 13, 14. The tape speed is regulated by an automatic phase control system which comprises a magnetic-tape drum speed sensor 15 (FIG. 2) for sensing the rotation speed of the drum 1, a sync signal head 16 (FIG. 1) scanning the magnetic tape 3 and electrically coupled with one input of a phase detector 17 of known design. The other input of the phase detector 17 receives an *a* signal from the speed sensor 15; the output of this detector 17 attaches an induction brake 18 which regulates the rotation speed of an intermediate pulley 12.

Figure 2:
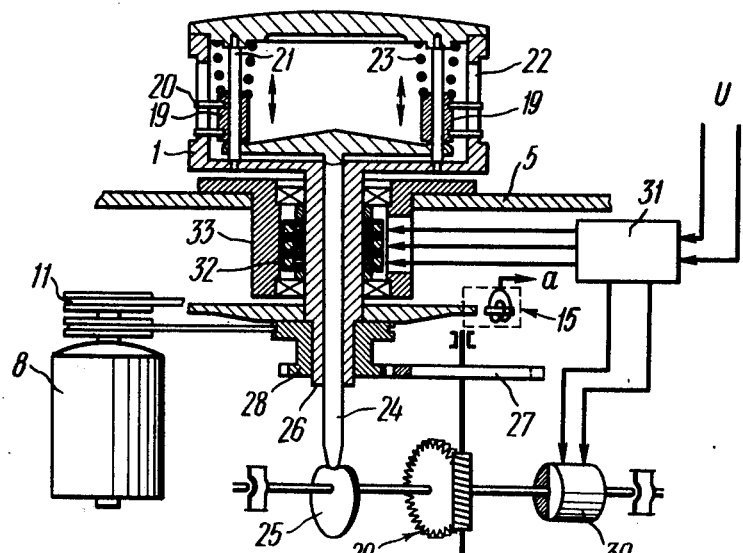
FIG. 2 is a sectional view taken along the line II—II of FIG. 1.

In the preferred embodiment of the invention assemblies 19 (FIG. 2) of magnetic heads 20 comprise each two heads 20 rigidly coupled with each other at a spacing equal to half the working width of the magnetic tape 3 (FIG. 1). The assemblies 19 (FIG. 2) are supported on guides 21 inside the drum 1 and can travel along these guides in the direction of the drum axis. To ensure a contact between the heads 20 and the tape 3 (FIG. 1), the cylindrical surface of the drum 1 has two slots 22 180° relative to each other along the drum periphery in which the heads 20 (FIG. 2) traverse a distance approximately equal to half the working width of the magnetic tape 3 (FIG. 1). Springs 23 are provided to take up backlashes and secure a return travel of the magnetic heads 20 (FIG. 2).

Reciprocating motion of the heads 20 is ensured by a central cam follower 24 cooperating with a symmetrical helical cam 25 which is coupled with a shaft 26 of the drum 1 through a pair of spur gears 27, 28 and a worm pair 29. The shaft of the cam 25 carries a switch 30 of known design which serves for switching over the upper and lower pairs of the heads 20 when the direction of travel of the assemblies 19 is reversed by the progressive motion of the cam follower 24. For the same purposes a switching unit 31 is provided whereby (and also with the aid of a commutator 32), a U signal of a video amplifier (not shown) is applied either to the upper or to the lower pair of the heads 20. The same elements are responsible for simultaneous switching over the pairs of the heads 20 when replaying a video signal.

The drum 1 rides in a bearing 33 on the deck 5 of the tape transport system and is rotated through a flexible endless belt 34 (FIG. 1) from the drive 8.

In this embodiment of the invention, the arrangement of the assemblies 19 (FIG. 2) made up of two heads 20 each, in each slot 22 of the drum 1 makes redundant a quick return travel of the magnetic heads 20 to their initial position at the and of each write/read cycle, because in this case both runs of the assembly 19 of the heads 20 are operational, and each elementary head 20 scans its respective half of the working surface of the magnetic tape 3 (FIG. 1).

Generally speaking, in this embodiment of the invention record tracks are not strictly longitudinal: they are canted at a certain angle with respect to the axis of the tape 3. The magnitude of this angle depends on the ratio of a head travel step to the length of the record track. However, since at normal values of the characteristics of a tape transport system this angle is very small, it does not affect operation of the device and can be neglected.

To prevent excessive wear-out of the working surface of the cam 25 (FIG. 2) caused by a high speed of rotation of the end face of the cam follower 24, in a physical device the cam follower may be fitted with an antifriction-bearing piece and decoupled from rotational motion (not shown).

In order to ensure a fixed location of the magnetic tape relative to the drum, the working surface of the latter has a guide groove calibrated against the width of the magnetic tape. For a more accurate placement of the tape on the drum, the adverse effect of its manufacture tolerances may be eliminated by setting up a requisite axial force which acts on a traveling tape to push the tape towards one edge of the guide groove, for example, the lower one. In this event, the proper alignment of the tape can be assured by guiding only one edge of the tape. Constructionally, this axial force can be created, for example, by making the working surface of the drum slightly conical in configuration.

On account of rigid coupling between the magnetic head assemblies and the shaft (drive) of the drum, the video record scan step remains constant in the course of a record/replay cycle. The magnitude of this step depends only on the transmission ratio of the reducing gear and the cam contour and is practically independent of the speed of the drum and the magnetic tape, which secures a highly accurate alignment of the travel path of the head during recording with that during replaying video information.

It should be pointed out that the precision of the cam contour is of no practical importance if the recording and playback operations are performed on the same video tape recorder. However, for the purpose of interchangeability of video tape recorders and video records, it is necessary to select the degree of precision of the cam contour, total angular error of the reducing gear and other associate elements coupled thereto with reference to the width of a magnetic track used and the magnitude of permissible stray deviations.

With a view to minimizing friction of the magnetic tape 3 (FIG. 1) against the surface of the drum 1 which is a particular requirement in systems where the tape is wrapped around the drum by about 360°, the working surface of the drum has a plurality of small holes 35, and blades 36 are mounted inside the drum to create an air cushion during rotation of the latter.

Another embodiment of the invention is the drum 1 with one slot 22 (FIG. 3) similar to the embodiment described above and wrapped by the tape at an angle close to 360°.

Its difference from the first embodiment is that all the members involved in effecting mechanical connection between the assembly 19 of the magnetic heads 20 with the drive 8 of the drum 1, are disposed right in the drum 1. Here, the connection elements are a cylinder-shaped helical cam 37, two central spur gears: a gear 38 rigidly coupled to the cam 37, and a gear 39 fitted on the end face of a stationary central shaft (which acts as the rotation axis of the drum in this embodiment of the invention), and a set of gears 40, 41 permanently meshed with the above gears 38 and 39 and mounted for free rotation at the base of the drum 1. The assembly 19 of the magnetic heads 20 mounted movably in the slot 22 on the guides 21 in the drum 1 cooperates with the working surface of the cam 37 through a roller 42 and is constantly urged into contact therewith by the spiral spring 23.

In the embodiment of the invention being described an assembly 43 (FIG. 4) of magnetic heads for two-channel video recording can be mounted in the slot 22 of the drum 1. In this case, the head assembly 43 contains four magnetic heads arranged with a mutual shift through one-fourth of the working width of the tape. In this arrangement, the upper pair of heads 44 provides recording and reproducing of video information of the first channel, and the lower pair of heads 45 is for recording and playback of video information of the second channel.

The length of the travel path of the assembly 43 is adjusted to about one-fourth of the working width of the tape and, therefore, each head is assigned an individual band on the tape for recording (replaying) of video information.

This version of the arrangement of the magnetic head assembly is also applicable for the embodiments of the invention of FIGS. 1 and 2 using drums with two slots and employing, similarly, uniform reciprocating movement of the heads.

It should be mentioned that this embodiment of the magnetic head assembly appreciably facilitates the structure of the assembly, since relatively large distances between individual magnetic heads permit practically complete elimination of cross noise arising due to mutual effects of the magnetic fields between different channels.

A third embodiment of the invention is also possible which is similar to the two embodiments described above.

Figure 5:
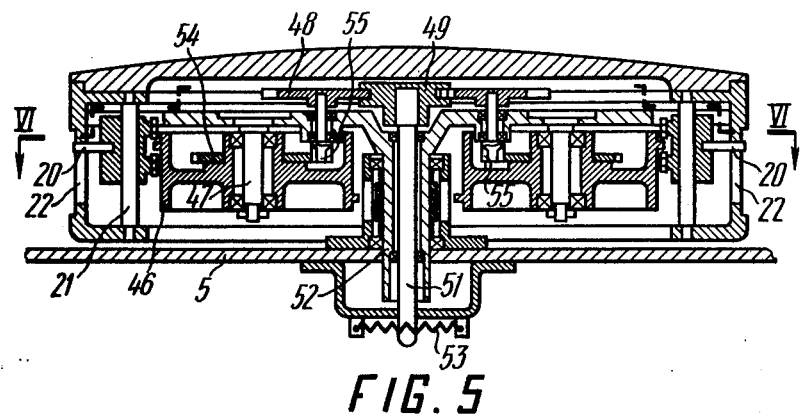
FIG. 5 is a longitudinal view of a third embodiment of a drum of a proposed tape transport system.

The third embodiment differs from the former two in that the drum 1 (FIG. 5) around which the tape 3 (FIG. 6) is wrapped at an angle 180° has two slots 22, each accommodating one magnetic head 20 (FIG. 5). The drive connection of the heads comprises intermittent travel elements which ensure their successive step-by-step motion whereby the magnetic head performing a working run (i.e. the one in registry with the magnetic tape) remains stationary relative to the drum, while the opposite head traveling idle is advanced through several recording steps at a time. A characteristic feature of this embodiment is that recording tracks are strictly longitudinal and are not canted relative to the tape axis, as is the case in the embodiments described above.

The slots 22 which are 180° relative to each other along the drum periphery accommodate one magnetic head 20 each. The heads are mechanically connected to drive through two helical cams 46 which ride on axles 47 inside the drum 1 and cooperate with the respective head 20. Mounted inside the drum 1 is also a system of two Geneva crosses 48 with a common driver 49 which are urged in turn by the rotating drum to get into engagement with a pin 50 of said driver 49 fastened on the upper end face of a stationary shaft 51 passing inside a shaft 52 of the drum 1. The lower end face of the shaft 51 is attached to the deck 5 of the tape transport system through a shock absorber 53. Each Geneva cross 48 is connected with a respective cam through a pair of spur gears 54, 55, of which one is rigidly coupled with the Geneva cross 48 (is seated on a common axis mounted for free rotation on the drum 1) and the other is coupled to the cam 46.

Obviously, a drive connection of the head by means of Geneva crosses is far from being the only feasible solution. A better embodiment of a similar circuit may be an independent drive for advancing the magnetic heads, with the operation of the drive precisely timed to the rotation of the drum.

Figure 7:
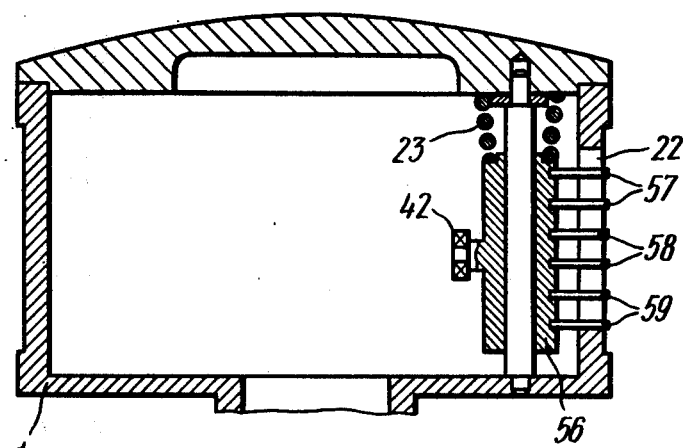
FIG. 7 is a longitudinal view of a fourth embodiment of a drum in a proposed tape transport system, using three pairs of magnetic heads for three-channel video recording.

The proposed tape transport system of a video tape recorder may employ both single- and multi-channel recording. The preferred embodiment of the invention under description uses three-channel recording of video information. An assembly 56 (FIG. 7) of magnetic heads comprises six elementary heads spaced at one-sixth of the working width of the tape 3 (FIG. 1). In this arrangement, the upper pair of heads 57 (FIG. 7) records and replays video signals in the first video channel, whereas the intermediate pair of the heads 58 and the lower pair of the heads 59 provide recording and reproducing in channels II and III, respectively. The travel path of the head assembly 56 is in this case adjusted to about one-sixth of the working width of the tape. This version of the head assembly 56 can be used for the same embodiments of the drum as the two-channel version represented in FIG. 4.

Figure 8:
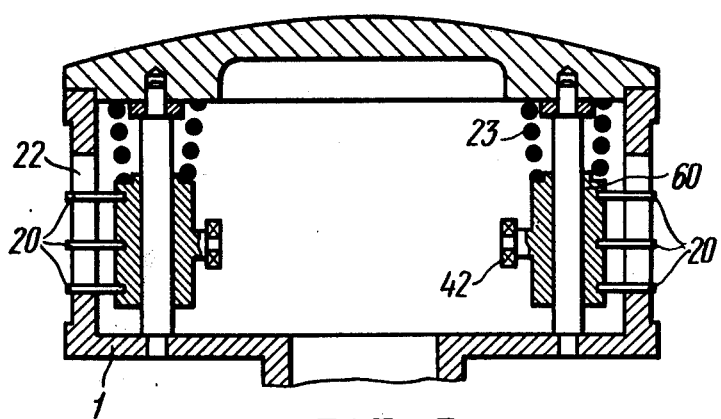
FIG. 8 is a longitudinal view of a fifth embodiment of a drum in a proposed tape transport system, with two slots, each containing a three-head assembly for three-channel video recording.

FIG. 8 illustrates the assembly 56 (FIG. 7) of the magnetic heads for three-channel video recording intended to be used in the embodiment with the drum I employing intermittent motion elements.

In this arrangement, each head assembly 60 comprises only three heads 20, the upper heads providing alternately recording and playback of video information in the first channel, and the intermediate and lower heads performing the same operations for channels II and III, respectively. The amount of travel of the head assembly 60 is adjusted to about one-third of the working surface of the magnetic tape 3 (FIG. 1).

Using the above embodiments of the proposed tape transport system, different video records can be obtained.

Figure 3:
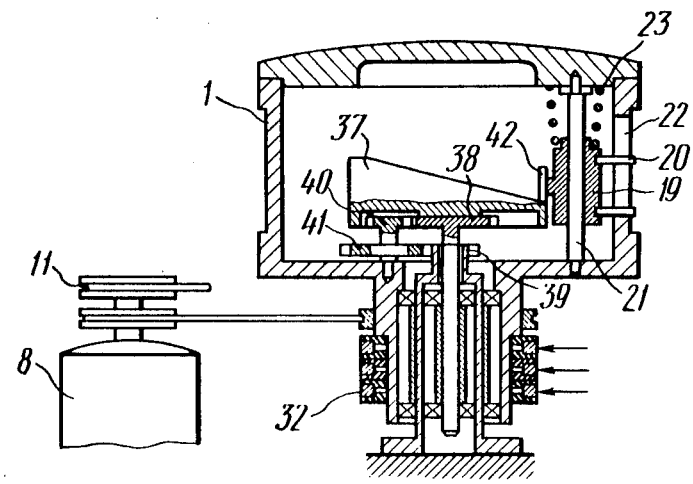
FIG. 3 is a longitudinal view of another embodiment of a drum in a proposed tape transport system.
Figure 9:
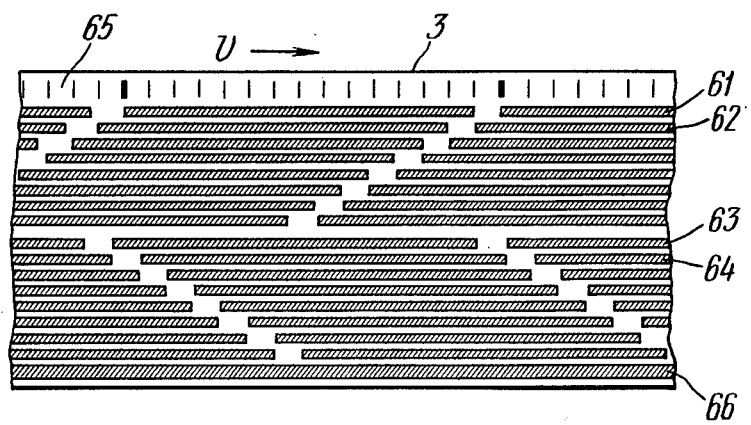
FIG. 9 shows a magnetic tape with a single-channel video record made by the tape transport system of FIGS. 1 and 3.

Thus, the embodiments of the invention shown in FIGS. 1 and 3 produce a tape record illustrated in FIG. 9. This video record contains parallelograms of longitudinal tracks 61, 62, 63 and 64 where video information is written, a track 65 of sync pulses, and a sound track 66.

Figure 4:
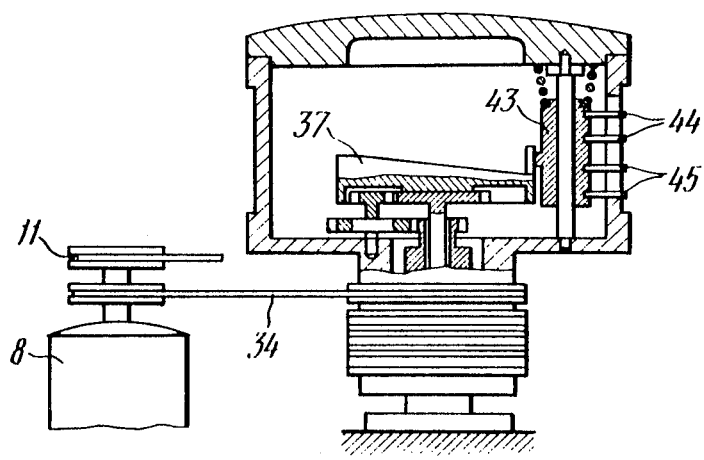
FIG. 4 is similar to FIG. 3, but with two pairs of magnetic heads for two-channel video recording.
Figure 10:
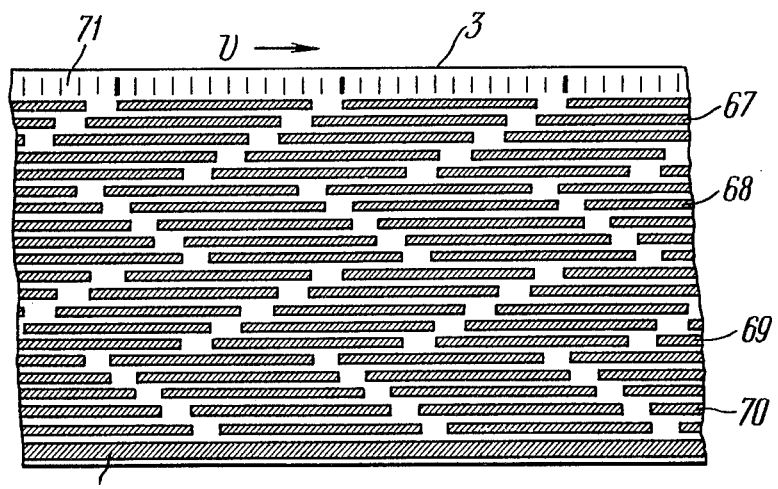
FIG. 10 shows a magnetic tape with a two-channel video record made by the tape transport system of FIG. 4.

The embodiment of FIG. 4 corresponds to a video tape record presented in FIG. 10. This video record contains parallelograms of longitudinal tracks 67, 68 of the first video channel, tracks 69, 70 of the second video channel, tracks 71 of sync pulses and a sound track 72.

The video record shown in FIG. II corresponds to the embodiment of the tape transport system illustrated in FIG. 5. It contains parallelograms of longitudinal video recording tracks 73, 74, 75, 76, a frame blanking pulse track 77, a sync pulse track 79, and a sound track 79.

The proposed tape transport system of a video tape recorder with longitudinal recording operates as follows.

The drive shaft 6 (FIG. 1) interacting with the roller 7 causes the magnetic tape 3 to rewing from the roll 4 mounted on one plane with the drum 1 onto the other roll 4 mounted on the same plane. The guides 2 guide the magnetic tape 3 so that it passes at an angle of 180° around the drum I rotated together with the magnetic heads 20 (FIG. 2) by the drive 8 counter to the direction of travel of the tape 3. Rotation from the shaft 26 of the drum I is imparted through the reducing gear mounted on the deck 5 and composed of a pair of the spur gears 27 and 28, and also the worm pair 29, to the symmetrical helical cam 25 which cooperates with the lower end face of the cam follower 24 and causes the latter to perform reciprocating motion. This reciprocating motion is transmitted through the upper end face of the cam follower 24 simultaneously to the two assemblies 19 of the magnetic heads 20 mounted at the same level in the opposing slots 22 of the drum I. The transmission ratio of the reducing gear and the counter of the cam 25 are selected such that the cam follower 24 (and, consequently, the assemblies 19 of the magnetic heads 20) traverse approximately half the length of the slot 22

(half the working width of the magnetic tape). Within one revolution of the drum I, both assemblies 19 of the heads 20 move at an equal speed through one step of the recording track thus traveling in a reciprocating manner. When the assemblies 19 of the magnetic heads 20 move upwards, the lower pair of the heads 20 is electrically connected, whereas during the downward travel the upper pair of heads 20 is in operation. In both cases the heads 20 make a working run and each pair of the heads 20 records (plays back) video signals in a respective half of the working surface of the tape 3 (FIG. 1).

The pairs of the heads 20 (FIG. 2) are electrically switched at the instants when the assemblies 19 reverse their motion, with an overlap within one track which ensures continuous recording and replaying of a video signal.

The structure of a video record for this embodiment of the invention is illustrated in FIG. 9. The record contains parallelograms of the longitudinal video tracks 61, 62 in the upper half of the working surface of the magnetic tape 3 which are recorded successively by the upper pair of the magnetic heads 20 (FIG. 2). The record comprises also parallelograms of the longitudinal video tracks 63, 64 (FIG. 9) recorded by the lower pair of the magnetic heads 20 (FIG. 2), the track 65 (FIG. 9) of frame blanking (or sync), and the sound track 66.

An identical video record is produced by the tape transport system using the drum of FIG. 3 (with one slot) which operates as follows.

Transported by the tape transport system, the magnetic tape 3 (FIG. 1) is wrapped by about 360° around the drum 1 which is rotated together with one assembly 19 of the magnetic heads 20 mounted in the slot 22 (FIG. 3) by means of the drive 8. The reducing gear disposed inside the drum 1 and made up of a set of the gears 40, 41 mounted in the drum 1 and urged by the rotating drum 1 to mesh with the other two gears 38, 39, of which one is rigidly connected with the helical cam 37 and the other is fastened to the end face of the stationary shaft that acts as a rotation axis of the drum, causes the cam 37 to rotate relative to the drum 1. The working surface of the cam 37 pushes the roller 42 of the assembly 19 of the magnetic heads 20, thus imparting to this assembly 19 reciprocating motion in the guide 21 through approximately half the working width of the magentic tape 3 (FIG. 1).

The operation of the tape transport system in the two-channel recording mode is similar to the one described above.

The only difference between the versions is that the tranmission ratio of the reducing gear and the contour of the cam 37 (FIG. 4) are selected so that the assembly 43 of the pairs of the magnetic heads 44 and 45 is advanced from about one-fourth of the working width of the tape 3 (FIG. 1). The video record obtained in this case is illustrated in FIG. 10 and contains parallelograms of the tracks 67, 68 of the first video channel recorded by the upper pair of the magnetic heads 44 (FIG. 4), parallelograms of the tracks 69 (FIG. 10), and 70 of the second video channel recorded by the lower pair of the magnetic heads 45 (FIG. 4), the sync pulse track 71 (FIG. 10) and the sound track 72.

The operation of the embodiment of the tape transport system illustrated in FIG. 5 which comprises intermittent movement elements is as follows.

As the drum 1 rotates, the Geneva crosses 48 engage in turn the pin 50 of the stationary driver 49 and impart intermittent reciprocating motion, through the gear 55 permanently meshed with the gear 54, to the respective cam 46. The working helical surface of the cam 46 cooperates with the respective head 20 and causes the latter to move through a requisite number of recording steps at a time.

Figure 6:
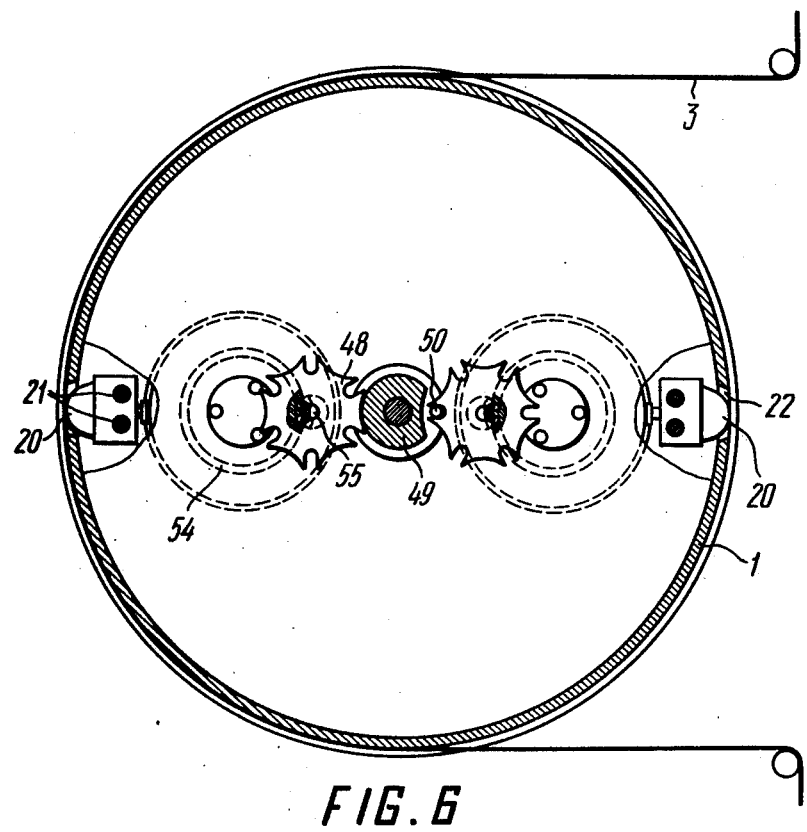
FIG. 6 is a sectional view taken along the line VI—VI of FIG. 5.

This jerk movement occurs at the instants when the head 20 makes an idle run, i.e., when it is not in registry with the magnetic tape 3 (FIG. 6). During the recording/reproducing run, the head 20 is not advanced, relative to the drum 1 because the Geneva cross 48 is stationary under the effect of the cylindrical surface of the driver 49. A required phase of the movement of operation of the heads 20 is set by rotating the shaft 51 to a required position and fixing it in this position with the aid of the shock absorber 53 which serves for damping shocks in the operating tape transport system.

The longitudinal video record shown in FIG. II is formed as follows.

After recording a track the magnetic head 20 (FIG. 5) is advanced in a jerk through four scan steps; at moments when the direction of the travel is reversed (at the end of each run of the head 20) it moves through two steps only which is made possible by the configuration of the working surface of the cam 46. This enables using both run of the heads as working runs: when moving down, the head records half of the longitudinal tracks; in its upward travel, the head records the other half of the tracks disposed between the tracks recorded in the previous cycle. It should be noted that this structure of a video record can be obtained only if all the tracks of the record are absolutely parallel to the axis of the magnetic tape / in systems with intermittent movement of the magnetic heads). If, however, the tracks are canted at some angle relative to the tape axis (in case the head is advanced continuously) the coefficient of utilization of the tape surface will be low, therefore, instead of one head two heads must be mounted in the slot as is the case in the embodiments illustrated above.

Figure 11:
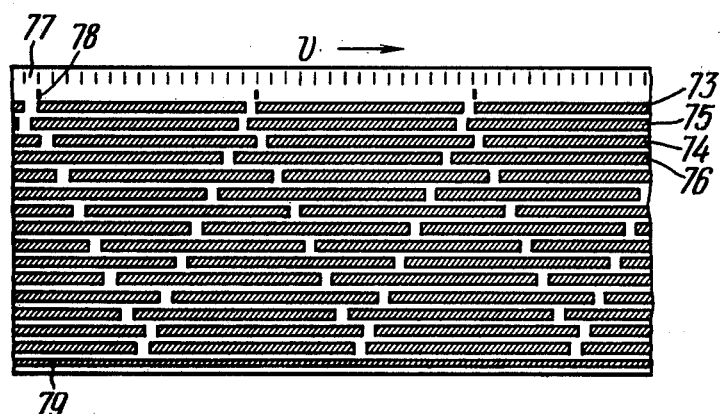
FIG. 11 shows a magnetic tape with a single-channel video record made by the tape transport system of FIG. 5.

The video record for the embodiment of the drum 1 of FIG. 5 is shown in FIG. 11. The record consists of parallelograms of the longitudinal tracks 73, 74 recorded during the downward run of the heads 20 (FIG. 5); parallelograms of the tracks 75 (FIG. 11) recorded by the heads 20 (FIG. 5) moving upward; the frame blanking pulse tracks 77 (FIG. 11); the track 78 for pulses timing the advance of the magnetic heads 20 (FIG. 5) relative to the drum 1, and also the sound track 79 (FIG. 11).

The proposed tape transport system of a video tape recorder with longitudinal recording possesses a number of important advantages over contentional tape transport systems. A stable longitudinal structure of the video record which does not depend on the drum rotation speed and is practically independent of the tape speed and is determined only by the mechanical constants of the tape transport system (cam contour), makes it possible to build up video recording systems of very high reliability for air-borne systems, for example, those of spacecraft. The tape transport system of the present invention presents a complete solution to the problem of multi-channel video tape recording which is made possible by the longitudinal structure of records obtained. It is also important that the head assemblied for multi-channel recording are simple and easy to manufacture.

The use of the tape transport system in domestic video recorders is highly promising, since it increases the recording density (supposedly by 5 times) and improves the performance characteristics of the entire apparatus.

The use of a punched magnetic tape obviates the need (in off-line systems) for maintaining the speed of the tape and the heads at a constant level which will appreciably simplify the electronic circuitry of the video tape recorders, reduce the cost and increase their dependability. The latter parameter makes video tape recording suitable for mass automatic information systems. The arrangement of the main elements of the tape transport system, namely, rolls and a drum, on one plane makes design of cassette video tape recorders a much easier job.

What is claimed is:

1. A magnetic tape scanning system for a video tape recorder providing scanning in the longitudinal direction of a moving magnetic tape, with the tape being wrapped about the periphery of a guide drum perpendicular to the drum axis comprising: a rotatably mounted drum of generally hollow construction having a shaft and having at least one slot in the periphery thereof disposed with its axis generally parallel to the axis of said drum, a magnetic head assembly in each of said slots with each of same mounted in said drum for reciprocating movement in the slot direction, guide means on said drum supporting and guiding said magnetic head assemblies to provide said reciprocating movement within said slot, drive means for rotating said drum and for reciprocating said magnetic head assembly, whereby the recording of video tape information is improved.

2. The magnetic tape transport system according to claim 1, including kinematic means mechanically coupling the rotation of said drum with the reciprocating movement of said magnetic head assembly.

3. A tape transport system as of claim 2, in which each said assembly of magnetic heads comprises additionally $(n-1)$ pairs of said magnetic heads, all said magnetic heads in such an assembly being rigidly interconnected at a spacing equal to $1/2n$ of the working width of said magnetic tape and advanced in a reciprocating manner through about $1/2n$ of this width, which permits recording of video information in $n$ channels simultaneously.

4. The magnetic tape transport system according to claim 1, wherein said drum is provided with a pair of slots disposed generally opposite each other, and each head assembly having two magnetic heads fixedly interconnected at a spacing equal to about half the working width of the magnetic tape; a cam surface and a cam follower having two end faces, forming part of said drive means, one end face cooperates with said magnetic head assemblies, and the other cooperates with said camming surface for providing said reciprocating movement of said magnetic head assembly; and gearing means forming part of said drive means to provide uniform reciprocating movement of said magnetic head assemblies through about half the working width of the magnetic tape while rotating said drum.

5. The magnetic tape transport system according to claim 4, wherein said camming surface is formed about the periphery of a flat disk-like cam.

6. The magnetic tape transport system according to claim 4, including a switching means mounted rigidly on a common axis of rotation with said cam for switching electrically said magnetic head assemblies at periods when the latter reverse the direction of their movement, with the result that said magnetic tape is scanned uniformly during forward and back movement of said magnetic head.

7. The magnetic tape transport system according to claim 1, wherein said magnetic head assembly in said slot is provided with two magnetic heads fixedly interconnected at a spacing equal to about half the working width of the magnetic tape; and a cam forming part of said drive means providing reciprocating movement of said magnetic head assembly; said cam being disposed within said hollow drum, and being cooperatively associated with gearing means forming part of said drive means for imparting uniform reciprocating movement of said magnetic head assembly for about half the working width of the magnetic tape, whereby the scanning of said tape is uniform during forward and back travel or reciprocating motion of said magnetic head assembly.

8. The magnetic tape transport system according to claim 7, wherein said cam is a two-dimensional cylindrical cam provided with a camming surface on a peripheral portion of an end face thereof.

9. A tape transport system as of claim 7, in which said magnetic head assembly comprises additionally $(n-1)$ pairs of said magnetic heads, all said magnetic heads in such an assembly being rigidly interconnected at a spacing equal to $1/2n$ of the working width of said magnetic tape and traveling in a reciprocating manner through a distance equal to about ½ of this width, which permits recording of video information in $n$ channels simultaneously.

10. The magnetic tape transport system according to claim 1, wherein said drum has two slots provided about 180° relative to each other, and each magnetic head assembly having one magnetic head, and two cams forming part of said drive means providing reciprocating movement to said magnetic head assemblies; said cams being disposed within said hollow drum, and each of said cams being cooperatively associated with a respective Geneva cross; a common driver for said Geneva crosses being mounted on an end face of a shaft disposed coaxially with the shaft of said hollow drum; said common driver comprising pin means engageable in turn by said Geneva crosses; and gearing means forming part of said drive means connecting each of said Geneva crosses to said respective cams for imparting alternate intermittent reciprocating motion to said magnetic head assemblies.

11. The magnetic tape transport system according to claim 10, wherein said cams are cylindrical cams provided with camming surfaces on the cylindrical side wall portions of said cams.

12. A tape transport system as of claim 10, wherein each said magnetic head assembly comprises additionally $(n-1)$ pairs said magnetic heads, all said magnetic heads in such assemblies being rigidly interconnected at a spacing equal to $1/n$ of the working width of said magnetic tape and traveling in an intermittent reciprocating manner through a distance equal to about $1/n$ of this width, which permits recording of video information in $n$ channels simultaneously.

* * * * *